United States Patent [19]

Ohmata et al.

[11] 4,380,368
[45] Apr. 19, 1983

[54] PROJECTION SCREEN

[76] Inventors: Ken Ohmata, 69-15, Minami Iwakuni-cho 2-chome, Iwakuni-shi, Yamaguchi-ken; Hideya Aoki, Mitsui Sekiyu Kagaku Yushu Nishi Shataku C18-102, 5, Yushudai Nishi 2-chome, Ichihara-shi, Chiba-ken; Naoyuki Tamura, 3-27, Misono-cho 1-chome, Otake-shi, Hiroshima-ken, all of Japan

[21] Appl. No.: 179,645

[22] Filed: Aug. 20, 1980

[30] Foreign Application Priority Data

Aug. 21, 1979 [JP] Japan ................................ 54/106861

[51] Int. Cl.³ ............................................. G03B 21/60
[52] U.S. Cl. ...................................... 350/117; 428/141; 428/152; 428/167; 428/472; 428/650; 428/686
[58] Field of Search ............... 428/472, 469, 650, 686, 428/141, 152, 167; 350/117, 128, 129; 352/129

[56] References Cited

U.S. PATENT DOCUMENTS

| Re. 7,657 | 5/1877 | Dimes | 428/687 |
| 1,999,042 | 4/1935 | Edwards | 428/687 |
| 2,177,572 | 10/1939 | Kögel | 428/687 |
| 2,326,042 | 8/1943 | Lessman | 350/117 |
| 2,508,058 | 5/1950 | Bradley | 350/117 |
| 2,991,544 | 7/1961 | Gotsch et al. | 428/687 |
| 3,408,132 | 10/1968 | Chandler et al. | 352/129 |
| 3,964,822 | 6/1976 | Yamashita | 350/117 |

FOREIGN PATENT DOCUMENTS 138904 2/1947 Australia ................. 350/129

Primary Examiner—Michael L. Lewis

[57] ABSTRACT

A projection screen comprises a metal plate member having substantially independent short raised ridges uniformly over the surface. In a process for treating the surface of a metal plate member, a metal plate member and a rough surface contacting the surface of the metal plate member are moved along respective axes intersecting at a certain angle to form raised ridges of typically 100 microns or less in length.

12 Claims, 7 Drawing Figures

PROJECTION SCREEN

BACKGROUND OF THE INVENTION

1. Field of the Invention

This invention relates to a projection screen and a process for production thereof.

2. Description of the Prior Art

There are known various processes for producing a screen used under daylight conditions. For example, a substrate provided with an aluminum surface is processed to produce a particular surface state for the aluminum.

An example of a process for producing the screen is that disclosed in U.S. Pat. No. 3,408,132. It is a method of making a front projection screen which includes the steps of: compressively rolling two thin sheets of reflective and deformable material in facing relationship with one another, whereby the facing surfaces of the two sheets are deformed to define generally elongated closely spaced irregularities extending generally in one direction; separating said two thin sheets; and mounting one of said sheets on a support surface with the surface of the sheet defining the elongated surface irregularities exposed for projection and with the elongated irregularities oriented in a generally vertical direction.

Another example is disclosed in U.S. Pat. No. 3,964,822. The projection screen includes a substrate having a metallic aluminum surface and a transparent film overlay. The metallic aluminum surface is provided with a pattern of directional irregularities and a pattern of craters. The pattern of directional irregularities is a directional cubic pattern which may be formed, for example, by applying a conventional mechanical surface treatment such as applying a grinding cloth of paper, a brush, a roller or the like to the aluminum surface. And further a process for producing such a screen is disclosed.

The former type of screen as shown in U.S. Pat. No. 3,408,132 uses a very thin metal foil so that it is liable to be deformed or destroyed upon forming the reflection surface. The thin foil is supported by a plate of FRP with an intervening urethane foam material, and therefore, the weight of screen becomes heavy, and the fire resistance of the screen is poor and the screen surface is easily recessed when pressed with a hand and further, when hand dirt, finger print, palm print and the like are adhered to the screen surface, it is difficult to remove said dirt. Thus the screen surface is liable to be dirtied. According to said process, metal foils are compressively rolled to form the screen reflection surface so that the conditions of the reflection surface are always the same, and therefore, it is very difficult to produce a screen surface having a varied brightness pattern depending upon the use of screen. In addition, the projection images have disadvantageous irregularities, that is, there are too bright portions and too dark portions in the images.

According to the latter method as shown in U.S. Pat. No. 3,964,822, the resulting screen has a high reflectivity and a high effective brightness so that projection under daylight conditions is possible, and there is no glare so that eyes are not tired when viewing images on the screen. However, vertical stripes which are too bright or too dark may be seen depending upon the direction in which the screen is viewed, that is, there appears an undesirable "rain-falling phenomenon" (infra).

SUMMARY OF THE INVENTION

An object of the present invention is to provide a screen which has a uniform surface brightness and is free from irregular light and dark portions.

Another object of the present invention is to provide a screen free from "rain-falling phenomenon" wherein light stripes or dark stripes appear on the projected image and it looks like rain is falling.

A further object of the present invention is to provide a screen having a desired brightness pattern depending upon the intended use.

Still another object of the present invention is to provide a screen of high durability.

A still further object of the present invention is to provide a screen whose weight is light and which has a good rigidity.

Still another object of the present invention is to provide a noncombustible screen.

A still further object of the present invention is to provide a process for producing such screen as above.

According to one aspect of the present invention, there is provided a projection screen which comprises a metal plate member having substantially independent short raised ridges uniformly over the surface.

According to another aspect of the present invention, there is provided a process for treating the surface of a metal plate member characterized in that a metal plate member and a rough surface contacting the surface of the metal plate member are moved along axes intersecting at a certain angle, respectively.

DESCRIPTION OF THE PREFERRED EMBODIMENTS

As the metal plate member used in the present invention, there may be used a metal plate, a metal foil or a laminate composed of such a metal member and a plastic plate, paper or synthetic paper. As the metal, aluminum is preferably used.

A metal plate member in a sandwich form, that is, aluminum foil laminated on both sides of a thermoplastic resin layer is preferable since there occurs no warp even when used for an extended period of time. The metal plate member may be in a form of a, so-called, plate, sheet or film.

In the present invention, the surface state of the metal plate member is important. It is a feature of the present invention that the reflection surface of the metal plate member is provided with substantially independent short raised ridges uniformly over the surface.

Figure 1:
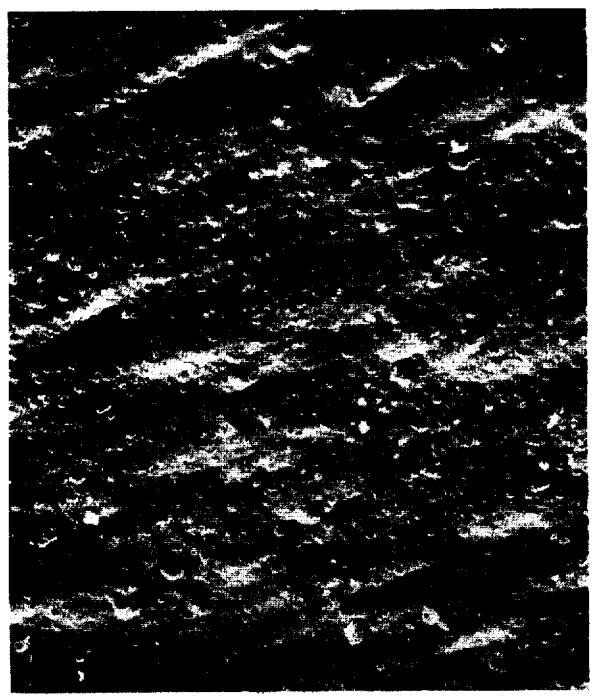
FIG. 1 is a microscopic photograph of a screen surface according to the present invention.

The shape and distribution of such short raised ridges are shown in FIG. 1 which is a microscopic photograph of the surface of a screen of an embodiment of the present invention (magnification of 500×).

Figure 7:
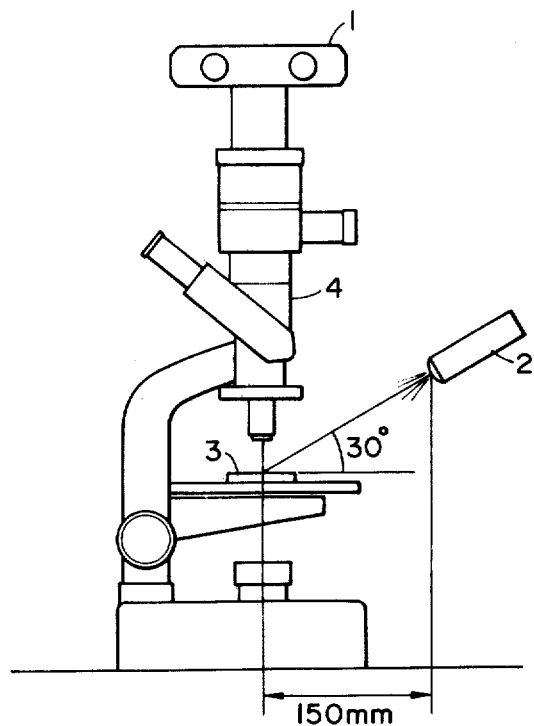
FIG. 7 shows schematically a method of photographing a screen surface by using a microscope and a camera.

Reflection performance of the short raised ridges can be observed by using a microscope as shown in FIG. 7. The microscope 4 (supplied by NIKON, Japan) is provided with a Polaroid camera 1, and a sample 3 of a screen is illuminated with a spot light source 2. The sample surface is illuminated at an angle of 30°. The illuminance at a surface perpendicular to the light direction is 40,000 lux. The horizontal distance between the point to be observed on the sample and the spot light source is 150 mm.

Figure 2:
FIG. 2 and FIG. 3 are microscopic photographs of screen surfaces according to the present invention corresponding to Example 1 and Example 2, respectively.
Figure 3:
Figure 4:
FIG. 4 and FIG. 5 are microscopic photographs of screen surfaces of prior art.
Figure 5:
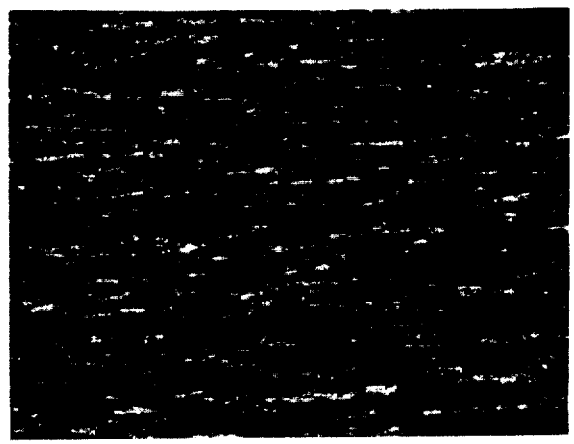

FIG. 2 and FIG. 3 are microscopic photographs of screen samples according to the present invention while FIG. 4 and FIG. 5 are those of prior art. The photographing conditions are:

| | |
|---|---|
| magnification | 150X |
| camera | Polaroid camera |
| film | Polaroid 667 type |
| exposure | set to the automatic exposure time |

In FIG. 4, the top portion of each of the raised portions is almost flat and this top flat portion mainly reflects light as shown by the white portions. Therefore, the luminance near the front area of the screen is so high that the luminance in the oblique direction from the screen is abruptly lowered.

The reflection surface of FIG. 4 is fabricated by compression rolling a thin metal foil so that the quality of the resulting screen fluctuates and there tends to produce failed screens at a high rate.

The prior art screen in FIG. 5 has long ridges elongated unidirectionally so that there appear too bright or too dark stripes on the screen depending upon an angle at which the viewer is positioned and the projected images suffer from "rain-falling phenomenon".

FIG. 2 and FIG. 3 are microscopic photographs of a screen according to the present invention. The sloping surface facing the light source of each of the short raised ridges is bright and white. The substantially independent short raised ridges are uniformly present over the surface. Since both sloping surfaces of each raised ridge can reflect light, the surface area of reflecting light is larger than that of conventional screens and the light diffusion is uniform and the image quality is good. The two sloping surfaces of each raised ridge serve to improve the reflection of light coming from anywhere between the front and either side. In addition, since the short raised ridges are distributed uniformly over the surface, too bright or too dark stripes do not appear.

In view of the foregoing, the drawback of prior art is cancelled.

The brightness pattern of the screen can be controlled by adjusting the shape and the number of the short raised ridges.

The shape and the number of the short raised ridges are determined depending upon each particular use.

Satisfactory projection screens for usual purposes and use can be obtained where the width of the raised ridge is 0.5-50 microns as a maximum, its length is 1-100 microns and $10^3$-$10^9$ such ridges are provided per $cm^2$.

When the density is less than $10^3$ ridges per $cm^2$, the brightness to the front surface is too strong, and when the density is larger than $10^9$ ridges per $cm^2$, light is reflected in all directions so that the image surface becomes dark and therefore the image surface is poor.

In the case of projection screens used in ordinary rooms or airplanes, preferable conditions of the raised ridges are 1-50 microns in width, 1-100 microns in length and $10^4$-$10^7$ ridges per $cm^2$, and more preferable conditions are 5-30 microns in width, 20-60 microns in length and $5 \times 10^4$-$10^6$ ridges per $cm^2$.

In FIGS. 2 and 3, the direction of the ridges is substantially unidirectional, but the directions could be random.

For example, projection screens for airplanes should have a brightness pattern capable of reflecting to a lateral direction as well as to a front direction since passenger's seats are widely positioned in a lateral direction.

On the contrary, in the case of a room extending in a longitudinal direction perpendicular to the screen surface, a screen having a brightness pattern of a high brightness gain in the front direction is necessary in order that even persons at a far rear end can see the screen image.

There are known various methods for producing a desired surface of a metal plate member such as a photo-etching method, a sand blast method, a method using a rotating abrasive member and the like.

In the case of the method using a rotating abrasive member such as a rotating brush, an abrasive wheel, an abrasive belt and the like, the abrasive member reciprocates in a direction at a certain angle with the direction of feeding of the metal plate member, or such relative movement between the abrasive member and the metal plate member may be effected by reciprocating the metal plate member or both the abrasive member and the metal plate member.

When a rotating abrading method is employed, the abrasive member and the metal plate member are moved relative one another in two separate directions to result in formation of a metal plate member surface which has substantially independent short raised ridges uniformly over the surface.

As a method for feeding the metal plate member to the abrasive member, there may be used various methods such as moving the metal plate member by a feeding roll, or moving the abrasive member on the surface of the metal plate member.

In order to form the pattern of the present invention on the surface of the metal plate, the feeding speed of the metal plate member to the abrasive member is required to be slower or faster than the peripheral speed of the abrasive member.

Among the above mentioned embodiments, the following embodiment is preferable since the apparatus can be simplified.

Figure 6:
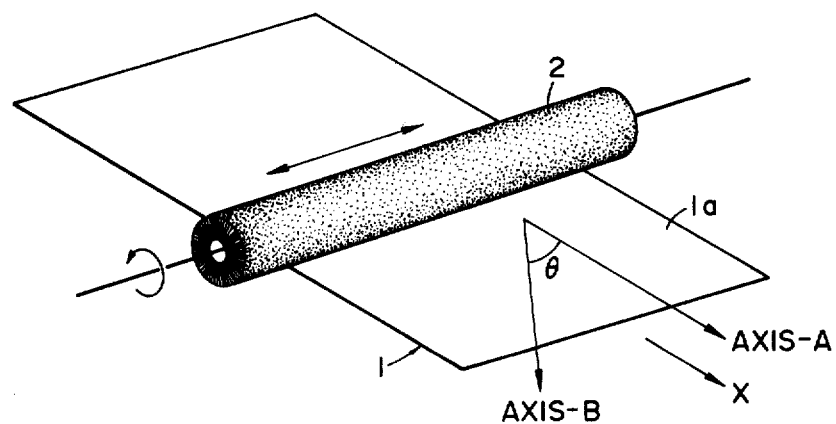
FIG. 6 shows schematically an embodiment of a process of the present invention.

Referring to FIG. 6, a metal plate member 1 is continuously fed to a rotating brush 2 by a feeding roll. The rotating brush contacts the surface 1a of the metal plate member 1 and reciprocates in the direction of the axis of the rotating brush while rotating to effect the surface processing treatment. The axis of the rotating brush 2 in FIG. 2 is perpendicular to the direction of feeding the metal plate member (arrow X, arrow "AXIS-A"). However, the rotating brush may be arranged in such a manner that the axis (in the direction of AXIS-B) of the rotating brush is disposed at an angle of $\theta$ with the direction of feeding the metal plate member (AXIS-A). A mechanism for rotating the rotating brush 2 while rubbing the surface of the metal plate member may be any known one.

The number of rotations of the abrasive member, reciprocating distance in the direction of the rotating axis of the rotating abrasive member, reciprocating speed and speed of feeding of the metal plate member may be optionally selected in each particular case.

According to the above embodiments of the present invention, a desirable metal surface for usual purposes can be obtained by effecting the surface treatment only once, but the treatment is repeated twice or more depending upon a particular use. In particular, when the surface treatment is repeated twice or more under conditions where the number of rotations, reciprocating distance, reciprocating speed, feeding speed of a metal plate member and the like are different each time, there can be produced a more uniform metal surface of a more excellent diffused reflection. The resulting metal plate member is an excellent projection screen substantially free from stripes when observed by eye.

When the metal plate member such as an aluminum plate member is continuously fed to a rotating brush and the rotating axis of the rotating brush is disposed at a substantially right angle with the direction of feeding the metal plate member, the diameter of the brush wire is preferably 0.01–0.3 mm, in particular 0.15–0.01 mm, and a steel wire is preferable.

When the wire diameter is less than 0.01 mm, the strength of wire is not sufficient and therefore it is difficult to abrade the metal surface. When the wire diameter is over 0.3 mm, surface becomes so rough that a uniform light diffusion can not be obtained.

The abrasive surface of the rotating brush is preferably in a form of cylindrical surface.

The peripheral speed of the rotating surface of the rotating brush is preferably 0.1–10 m/sec.

When the peripheral speed is less than 0.1 m/sec., the rotating brush sometimes stops and then suddenly begins to rotate, and therefore, uniform irregularity patterns can not be formed on the metal surface. And further the productivity is low.

When the peripheral speed of the rotating brush exceeds 10 m/sec, reciprocation of the brush is difficult and further balancing with the reciprocation is difficult.

The reciprocating distance in the direction of rotating axis of the rotating abrasive member is preferably 10–300 mm. When the reciprocating distance is less than 10 mm, there can not be produced uniform roughness of the surface of the metal plate member. When the reciprocating distance is outside of the above mentioned range, the resulting roughness of the metal surface is not uniform.

The number of reciprocating is preferably 10–1000 times/min. Outside of this range, the resulting roughness of the metal surface is not uniform.

The speed of feeding the metal plate member is preferably 0.01–10 m/sec.

The projection screen is used in such a manner that the direction of the ridges of the short raised strips on the metal surface is vertical.

It is further preferable that the surface of the screen is provided with many non-directional irregularities.

Such non-directional irregularities may, for example, crater patterns such as many large or small unevenness, complicated unevenness pattern formed by alkali etching or acidic etching accompanied by dissolution of the metal or unevenness patterns formed by liquid honing or by a jet abrading method such as sand blast, grid thrust and the like. The etching may be effected by conventional alkali etching or acidic etching. In other words, alkali etching may be conducted by treating a metal surface, e.g. aluminum, of the metal plate member subjected to the mechanical surface treatment with an aqueous solution of alkali such as, for example, sodium hydroxide. Acidic etching may be effected by treating the metal surface, e.g. aluminum, with an acid such as, for example, nitric acid, hydroxhloric acid, sulfuric acid, phosphoric acid, and hydrofluoric acid.

For example, when 2 N. aqueous solution of sodium hydroxide is used at 30° C., the aluminum surface is, in general, soaked in the aqueous solution for 3–15 min. When 1 N. hydrofluoric acid is used at 30° C., the aluminum surface is usually soaked in the hydrofluoric acid for 5–25 min. The etching temperature is preferably lower than 90° C. so as to prevent vaporization of water. When the etching time is too short, the crater pattern is not sufficiently formed. On the contrary, when the etching time is too long, the previously formed short raised ridges disappear.

In this way, there is obtained an excellent projection screen having good brightness characteristics and free from "rain-falling phenomenon".

The crater pattern formed by the mechanical treatment and the alkali etching according to the present invention is shown in the microscopic photograph of FIG. 2 where the small holes are craters formed by the etching.

It is preferable to form a transparent film on the surface of the metal plate member of the present invention so as to protect the surface. For example, when the metal is aluminum, the protective transparent film is an aluminum oxide film. Further, for example, there may be used a plastic coating film, a transparent paint film and the like.

For the purpose of forming a transparent film for protecting the metal surface, anodization is preferably employed. The aluminum oxide film may be produced by conventional anodization. The aluminum surface having the short raised ridges and crater pattern is subjected to electrolysis by placing the aluminum surface in an electrolysis bath such as sulfuric acid bath, sulfosalicylic acid bath, phosphoric acid bath and the like. For example, when a 2 N. sulfuric acid bath is employed as an electrolysis bath, it is usual to electrolyze at 1 A/dm$^2$–5 A/dm$^2$ for 2–30 min. The anodization treatment produces an oxide film on the metallic aluminum surface to protect the surface. When the oxide film is too thick, the post-processing becomes difficult so that the thickness is preferably 0.5–10 microns.

It is preferable to soak the aluminum surface thus anodized in a flowing water for washing and further it is preferable to apply a conventional treatment for sealing holes so as to eliminate fine holes and render the surface smooth.

In the use of projection screen, the transparent film is preferably provided with a pattern corresponding to a pattern on the surface of the metal surface. Thickness of the transparent film is preferably not thicker than 10 microns. When the thickness exceeds 10 microns, the reflection rate is lowered by opacity caused by impurities and further there occurs interference of light on the surface of the film to form so-called "rainbow".

EXAMPLE 1

(Middle brightness type)

An aluminum plate member of 120 cm wide and 100 cm long comprised an aluminum layer of 0.1 mm thick, a polyethylene layer of 1.8 mm and an aluminum layer of 0.1 mm (total thickness of 2.0 mm) was fed to a rotating brush at a speed of 30 cm/min. The rotating brush having a brush wire of 0.08 mm in diameter was rotated at a brush peripheral speed of 2 m/sec. and the rotating brush was reciprocated in the direction of the rotating axis at a reciprocating distance of 8 cm at reciprocating number of 65 times per min. to process the surface of the aluminum plate member resulting in formation of short raised ridges.

The resulting surface of the aluminum plate member was washed with water and then subjected to an etching treatment with a mixture of sulfuric acid 45% by weight, phosphoric acid 48% by weight and water the balance at 77.5° C. for 40 sec. to form a non-directional crater pattern on the surface of the aluminum plate member without eliminating the short raised ridge.

The resulting aluminum plate was subjected to electrolysis in a 2 N. aqueous sulfuric acid at a current density of 1 A/dm$^2$ for 10 minutes to form an oxide film of 3 micron thick, followed by washing to obtain an aluminum plate for a projection screen as illustrated in FIG. 2.

The luminance ratio at various spread angles in a horizontal sense at the same distance from the light incident point of the resulting aluminum plate was measured, and the result is listed in Table below.

The number of the short raised ridges was about 170,000/cm$^2$ and the strips were 5-30 microns wide and 20-60 microns long.

EXAMPLE 2

(High brightness type)

The same aluminum plate member as in Example 1 was fed to a rotating brush at a speed of 35 cm/min.

The rotating brush having a brush wire of 0.08 mm in diameter was rotated at a brush peripheral speed of 2 m/sec. and was simultaneously reciprocated in the direction of the rotating axis at a reciprocating distance of 8 cm with a reciprocating number of 65 times per min. to process the surface of the aluminum plate member to form short raised ridges.

The resulting surface of the aluminum was subjected to a surface etching treatment with a mixture of sulfuric acid 45% by weight, phosphoric acid 48% by weight and water the balance at 85° C. for 50 sec. to produce a crater pattern without eliminating the short raised ridges.

The resulting aluminum plate was subjected to electrolysis in a 2 N. aqueous sulfuric acid at a current density of 1 A/dm$^2$ for 10 minutes to form an oxide film of 3 micron thick, followed by washing to obtain an aluminum plate for a projection screen as illustrated in FIG. 3.

The luminance ratio at various spread angle in a horizontal sense at the same distance from the light incident point of the resulting aluminum plate was measured and the result is listed in Table below.

The number of the short raised ridges was about 150,000/cm$^2$ and the strips were 5-30 microns wide and 20-60 microns long.

In the following Table, luminance ratio of the screen of FIG. 4 is listed as comparison Example. The result shows that the luminance ratio of the screen of FIG. 4 is rapidly lowered as the spread angle increases.

TABLE

|  | Example 2 (FIG. 3) (High brightness type) | Example 1 (FIG. 2) (Middle brightness type) | Comparison Example (FIG. 4) |
| --- | --- | --- | --- |
| Feeding speed of an aluminum plate member | 35 cm/min | 30 cm/min |  |
| Wire diameter of a brush | 0.08 mm ⌀ | 0.08 mm ⌀ |  |
| Peripheral speed of a brush | 2 m/sec | 2 m/sec |  |
| Reciprocating distance | 8 cm | 8 cm |  |
| Number of reciprocation | 65 times/min | 65 times/min |  |
| Etching |  |  |  |
| Treating temperature | 85° C. | 77.5° C. |  |
| Treating time | 50 sec | 40 sec |  |
| Luminance ratio, defined as the ratio of the luminance of a screen material relative to that of a perfect diffuser, the horizontal light distribution. |  |  |  |
| Spread angle |  |  |  |
| 0° | 11 | 7 | 13 |
| 10° | 10 | 6.6 | 10.6 |
| 20° | 7.2 | 5.8 | 6 |
| 30° | 3.5 | 4.0 | 2.3 |
| 40° | 1.8 | 3.4 | 0.74 |
| 50° | 0.94 | 2.9 | — |
| 60° | 0.55 | 2.0 | — |

We claim:

1. A projection screen having a surface formed by a metal plate member having a plurality of raised ridges which are substantially unidirectional with a ridge density of about $10^3$ to $10^9$ ridges per $cm^2$, said ridges each being formed by two side surfaces sloping towards one another and having a maximum width of about 0.5 to 50 microns; said ridges each having a length of approximately 100 microns or less, said projection screen further including a plurality of surface irregularities formed by crater patterns; said projection screen further including an outer coating of the oxide of the metal forming the plate member.

2. A projection screen according to claim 1, said ridges each being formed by two side surfaces sloping towards one another and having a maximum width of approximately 1.0 to 50 microns.

3. A projection screen according to claim 1, said ridges each being formed by two side surfaces sloping towards one another and having a maximum width of approximately 5.0 to 30 microns.

4. A projection screen according to claim 1, said ridges each having a length of approximately 20 to 60 microns.

5. A projection screen according to claim 1, said ridges being substantially unidirectional with a density of approximately $10^4$ to $10^7$ ridges per $cm^2$.

6. A projection screen according to claim 1, said ridges being substantially unidirectional with a density of approximately $5 \times 10^4$ to $10^6$ ridges per $cm^2$.

7. A projection screen according to claim 1, said irregularities being formed by etching said surface.

8. A projection screen having a surface formed by a metal plate member having a plurality of raised ridges which are substantially unidirectional with a ridge density of about $10^3$ to $10^9$ ridges per $cm^2$, said ridges each being formed by two side surfaces sloping towards one another and having a maximum width of about 0.5 to 50 microns; said projection screen further including a plurality of surface irregularities formed by crater patterns; said projection screen further including an outer coating of the oxide of the metal forming the plate member, said plurality of raised ridges each having a length of approximately 100 microns or less, discontinuous and formed by abrading said plate member with an abrasive member moving reciprocally relative said plate member in two directions simultaneously.

9. A projection screen according to claim 8, said abrasive member being rotated in contact with said plate member while being reciprocated in a direction different from the direction of rotation.

10. A projection screen according to claim 9, wherein said abrasive member is selected from a group consisting of a rotating brush, an abrasive wheel, an abrasive cloth and an abrasive belt.

11. A projection screen according to claim 9, said abrasive member being rotated along its axis while being reciprocated axially as said plate member is fed in a direction perpendicular to the axis of said rotating member.

12. A projection screen according to claim 11, the peripheral speed of said abrasive member being different than the speed of movement of said plate member.

* * * * *